(12) United States Patent
Koyata et al.

(10) Patent No.: US 7,676,844 B2
(45) Date of Patent: Mar. 9, 2010

(54) SIGNAL REPRODUCING SYSTEM

(75) Inventors: Tomohiro Koyata, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1395 days.

(21) Appl. No.: 11/016,328

(22) Filed: Dec. 17, 2004

(65) Prior Publication Data

US 2005/0144344 A1  Jun. 30, 2005

(30) Foreign Application Priority Data

Dec. 24, 2003  (JP) ............................. 2003-428408

(51) Int. Cl.
*G06F 17/30* (2006.01)
(52) U.S. Cl. .................. 726/26; 726/2; 726/7; 726/27; 726/28; 713/182; 713/189; 713/193; 380/201; 380/277; 710/60; 710/72; 710/74; 705/51; 705/67
(58) Field of Classification Search .................. 726/26, 726/27; 709/204, 231; 713/189; 710/72; 380/201, 277; 705/51, 67; 386/124
See application file for complete search history.

(56) References Cited

U.S. PATENT DOCUMENTS

| | | | | |
|---|---|---|---|---|
| 4,628,359 | A * | 12/1986 | Okada et al. ................. | 380/241 |
| 5,640,453 | A * | 6/1997 | Schuchman et al. ......... | 380/211 |
| 6,169,570 | B1 * | 1/2001 | Suzuki ....................... | 725/105 |
| 6,640,306 | B1 * | 10/2003 | Tone et al. ..................... | 726/4 |
| 6,704,777 | B2 * | 3/2004 | Matsumoto et al. ......... | 709/219 |
| 6,748,424 | B1 * | 6/2004 | Usuda ......................... | 709/217 |
| 7,213,156 | B2 * | 5/2007 | Fukuda ....................... | 713/189 |
| 7,233,787 | B2 * | 6/2007 | Higuchi et al. ........... | 455/414.1 |
| 7,251,330 | B2 * | 7/2007 | Terao et al. ................. | 380/255 |
| 7,472,001 | B2 * | 12/2008 | Grace et al. .................... | 701/36 |
| 7,533,180 | B2 * | 5/2009 | Ebihara et al. .............. | 709/229 |
| 2001/0054134 | A1 * | 12/2001 | Nagatomo et al. .......... | 711/163 |
| 2002/0150389 | A1 * | 10/2002 | Komoda ...................... | 386/94 |
| 2002/0154759 | A1 * | 10/2002 | Ishii ...................... | 379/373.01 |
| 2003/0056106 | A1 * | 3/2003 | Wang .......................... | 713/189 |

(Continued)

FOREIGN PATENT DOCUMENTS

EP  0 923 076 A1  6/1999

(Continued)

OTHER PUBLICATIONS http://www.ipsj.or.jp; 2000-SLDM-97, vol. 2000, No. 79, Issn 0919-6072.

*Primary Examiner*—Nasser G Moazzami
*Assistant Examiner*—Shanto M Abedin
(74) *Attorney, Agent, or Firm*—Wolf, Greenfield & Sacks, P.C.

(57) ABSTRACT

Based on user identification data transmitted together with a compressed data from a portable reproducing apparatus, if an apparatus recognizes that a user who purchased and downloaded the compressed data is the same as a user who owns the apparatus, the audio apparatus stores and holds the compressed data after reproducing the signal from the compressed data by the decoder unit and the data processing unit. Alternatively, if it recognizes that the user who purchased and downloaded the compressed data is not the same as the user who owns the apparatus, it removes the compressed data after reproducing the signal from the compressed data by the decoder unit and the data processing unit.

3 Claims, 6 Drawing Sheets

U.S. PATENT DOCUMENTS

| | | | |
|---|---|---|---|
| 2003/0110382 A1* | 6/2003 | Leporini et al. | 713/172 |
| 2004/0006541 A1* | 1/2004 | Huddelston et al. | 705/51 |
| 2004/0210821 A1 | 10/2004 | Kasser | |
| 2005/0091447 A1* | 4/2005 | Kuma et al. | 711/112 |

FOREIGN PATENT DOCUMENTS

| | | |
|---|---|---|
| EP | 1 126 357 A2 | 8/2001 |
| JP | 8-129826 | 5/1996 |
| JP | 10-322648 | 12/1998 |
| JP | 11-259964 | 9/1999 |
| JP | 2000-163803 | 6/2000 |
| JP | 2001-67787 | 3/2001 |
| JP | 2002-9946 | 4/2002 |
| JP | 2003-99074 | 4/2003 |
| WO | WO 99/09718 | 2/1999 |
| WO | WO 99/46933 | 9/1999 |
| WO | WO 03/026207 A2 | 3/2003 |

* cited by examiner

SIGNAL REPRODUCING SYSTEM

CROSS REFERENCES TO RELATED APPLICATIONS

The present document claims is based on Japanese priority document JP2003-428408, filed to the Japanese Patent Office on Dec. 24, 2003, the entire contents of which being incorporated herein by reference to the extent permitted by law.

The present invention relates to a reproducing system which is suitable for reproducing music data stored in a portable reproducing apparatus such as an MP3 (MPEG Audio Layer-3) player.

In recent years, music data purchased from content distributors and the like through the Internet are stored in a portable reproducing apparatus such as an MP3 (MPEG Audio Layer 3) player, so that the user can listen to the audio outdoors by carrying the portable reproducing apparatus. Such technology is described in Japanese Laid-Open Patent No. 2000-77960 (page 3), for example.

If music data stored in such a portable reproducing apparatus is inadvertently transmitted to another person's reproducing apparatus, then the above-mentioned music data may be stored and held in various other reproducing apparatuses. Thus, there is a possibility that problems relating to copyrights, etc. may arise. As a method for avoiding this problem, a portable reproducing apparatus may be provided with a function which does not transmit data to the outside once it is stored.

If such a method is employed, however, once a user stores the duly purchased music data in this portable reproducing apparatus, the above-mentioned music data may not be transmitted to another reproducing apparatus even if its is the user's own apparatus. As a result, the user must always use a specific portable reproducing apparatus, otherwise the music based on the music data cannot serve for listening. Thus, a problem arises in that convenience is considerably compromised.

The present invention has been conceived in view of the above issues, and provides a reproducing system which may improve convenience to the user.

A preferred embodiment of the present invention provides a reproducing system comprising a first reproducing apparatus and a second reproducing apparatus for reproducing a signal from content data, wherein the first reproducing apparatus has a storage means for linking and storing the content data to be reproduced and propriety data indicating whether or not the second reproducing apparatus has propriety of storing and holding the content data; and a transmitter for transmitting the content data stored in the storage means and the propriety data corresponding to the content data to the second reproducing apparatus; and the second reproducing apparatus has a recognition means for recognizing whether or not the content data may be stored and held based on the propriety data, upon receiving the content data and the propriety data from the first reproducing apparatus; and a controller for storing and holding the content data into a storage means after reproducing the signal from the content data if the recognition means recognizes propriety of storing and holding the content data, and for deleting the content data after reproducing the signal from the content data if the recognition means recognizes no propriety of storing or holding the content data.

Moreover, according to a preferred embodiment of the present invention, a reproducing apparatus is provided with a recognition means for recognizing whether or not the above-mentioned content data can be stored and held, based on the above-mentioned propriety data, if receiving from outside the content data and the propriety data indicating whether or not the above-mentioned reproducing apparatus has propriety of storing and holding the above-mentioned content data; and a controller for storing and holding the above-mentioned content data in a predetermined storage means after reproducing the signal from the above-mentioned content data if the recognition means determines propriety of storing and holding the above-mentioned content data, and for removing the above-mentioned content data after reproducing the signal from the above-mentioned content data if recognition means determines no propriety of storing and holding the above-mentioned content data.

Furthermore, according to a preferred embodiment of the present invention, a reproducing apparatus is provided with a reproducing means for reproducing the signal from content data; a storage means for linking and storing the content data for reproducing by the reproducing means and propriety data indicating whether or not another reproducing apparatus which can reproduce the signal from the above-mentioned content data may store the above-mentioned content data; and a transmission means for transmitting, to another reproducing apparatus, the above-mentioned content data and the propriety data corresponding to the above-mentioned content data stored in the storage means.

Further, according to a preferred embodiment of the present invention, a reproducing method includes a first step of recognizing whether or not a second reproducing apparatus having received content data and propriety data which indicates whether or not the second reproducing apparatus can store the above-mentioned content data from the first reproducing apparatus for reproducing a signal from the content data, may store the above-mentioned content data based on the above-mentioned propriety data; and a second step of storing and holding the above-mentioned content data in a predetermined storage means after reproducing the signal from the above-mentioned content data if it is determined that the second reproducing apparatus may store the received content data, and, alternatively, removing the above-mentioned content data after reproducing the signal from the above-mentioned content data if it is determined that the second reproducing apparatus may not store the received content data.

Thus, the second reproducing apparatus stores and holds the above-mentioned content data after reproducing the above-mentioned content data if it is determined to be able to store the above-mentioned content data, based on the propriety data transmitted from the first reproducing apparatus together with the content data, alternatively removes the above-mentioned content data after reproducing the above-mentioned content data if it is determined not to be able to store or hold the above-mentioned content data. Thus, it becomes possible to selectively store the content data stored in the first reproducing apparatus only in a second reproducing apparatus which cannot cause a copyright-related problem.

Therefore, according to the preferred embodiments of the present invention, the content data which is stored in the first reproducing apparatus can selectively be stored and held only in the second reproducing apparatus that does not cause a copyright-related problem. As a result, it is possible to realize a reproducing system which can avoid copyright-related issues, while improving convenience to the user.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

With reference to the drawings, preferred embodiments of the present invention will be described in detail below.

(1) STRUCTURE OF A MUSIC REPRODUCING SYSTEM

Figure 1:
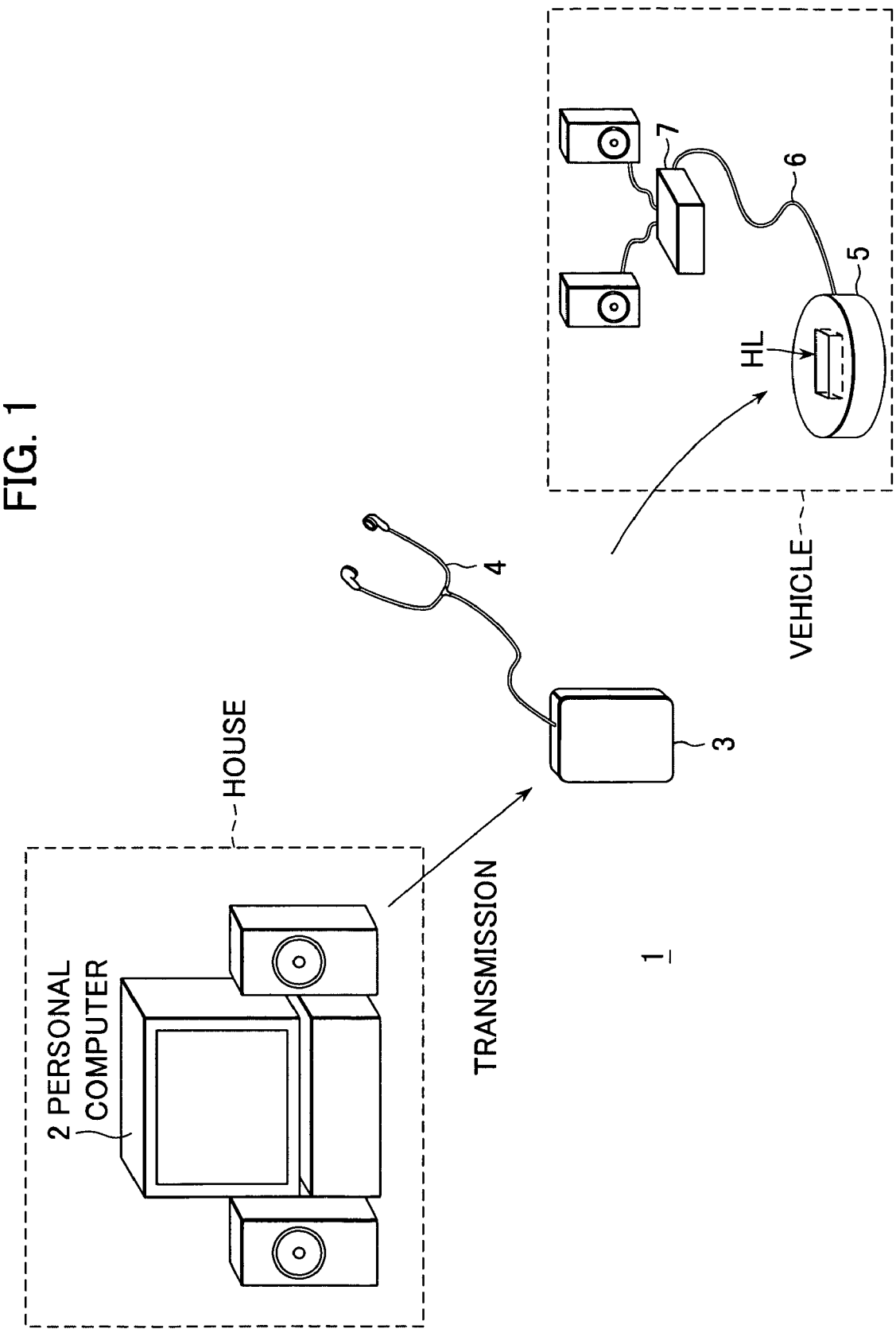
FIG. 1 is a schematic illustration showing a structure of a music reproducing system in accordance with a preferred embodiment of the present invention.

In FIG. 1, reference numeral 1 generally depicts a music reproducing system according to a preferred embodiment of the present invention. A personal computer 2 installed in a user's house downloads compressed and encoded music data (hereinafter, referred to as compressed music data) from the Internet, according to a predetermined operation of the user, and is stored and held in an internal hard disk drive.

After connecting to a portable reproducing apparatus 3 by cable (not shown), the personal computer 2 transmits the stored and held compressed music data to a portable reproducing apparatus 3 through the cable if the user issues instructions to perform a transmission operation. At this event, the portable reproducing apparatus 3 stores and holds the received compressed music data in the internal hard disk drive.

Thereafter, if the user issues instructions to perform a reproducing operation, the portable reproducing apparatus 3 carries out an expansion and decoding process for the compressed music data according to the above-mentioned reproducing operation, out of the stored and held compressed music data, so as to generate the music data (a so-called PCM (Pulse Code Modulation) data). Then, it performs a D/A conversion process etc. with respect to the generated music data, and plays music through earphones 4 which are connected to the music based on the thus obtained music signal (a so-called analog signal).

Further, if the portable reproducing apparatus 3 is carried into a car owned by the user and its casing is inserted into an insertion hole HL of a station 5 installed inside the car, it starts communicating with an audio apparatus 7 in the car through a cable 6 extended from this station 5.

In this situation, if the user instructs an operation unit of the portable reproducing apparatus 3 to perform the reproducing operation, the portable reproducing apparatus 3 transmits the compressed music data corresponding to the above-mentioned reproducing operation, out of the stored and held compressed music data, to the audio apparatus 7. At this event, the audio apparatus 7 sequentially performs the expansion and decoding process and the D/A conversion process etc. with respect to the compressed music data received from the portable reproducing apparatus 3, and plays music through a speaker based on the thus obtained music signal.

(2) STRUCTURE OF A PERSONAL COMPUTER

Figure 2:
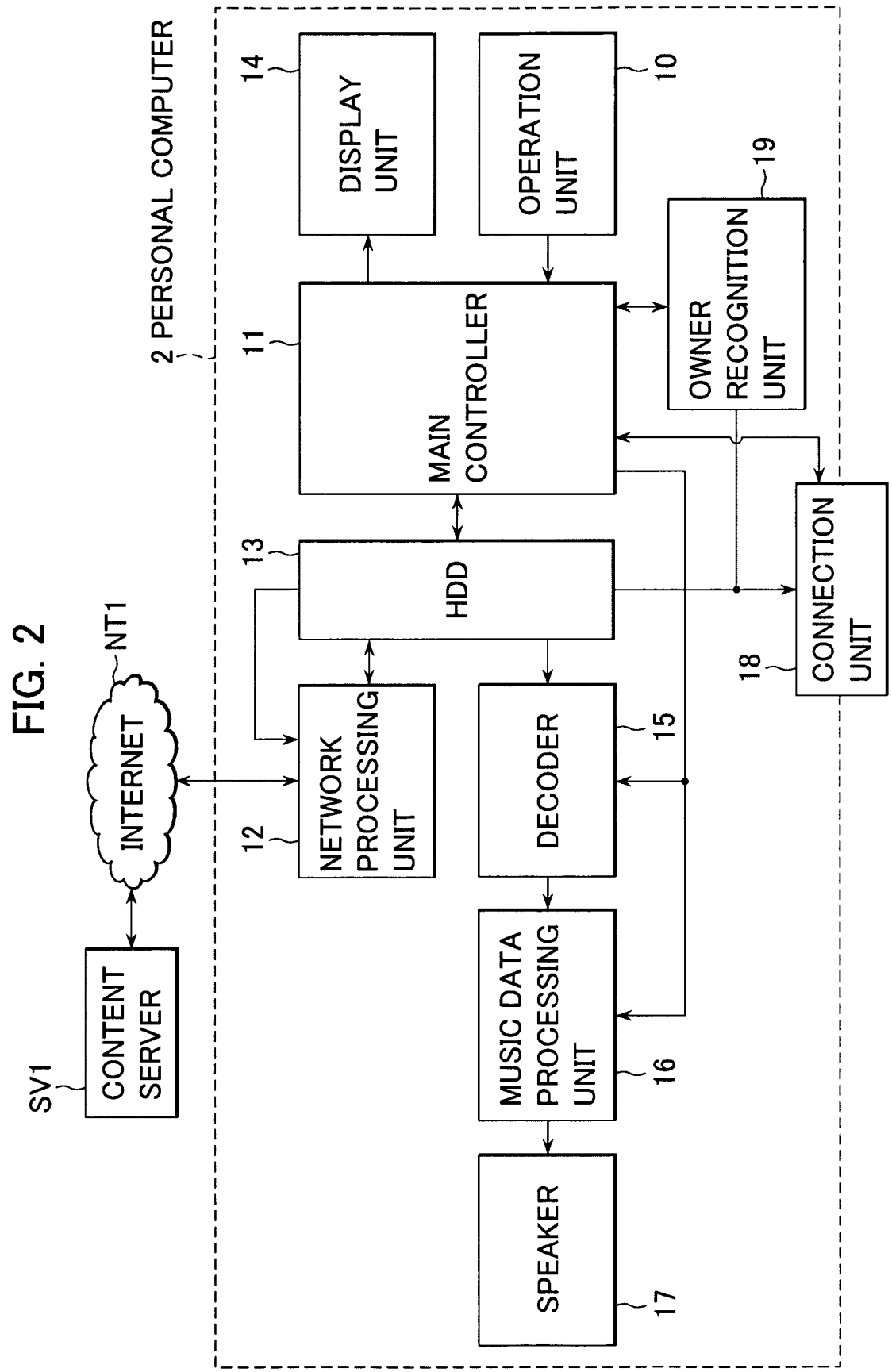
FIG. 2 is a schematic diagram showing a structure of a personal computer.

In the personal computer 2 as shown in FIG. 2, if the user performs an operation through an operation unit 10 to issue instructions to access a content server SV1 in an Internet NT1, then a main controller 11 controls a network processing unit 12 so as to access the content server SV1 through the Internet NT1.

Figure 3:
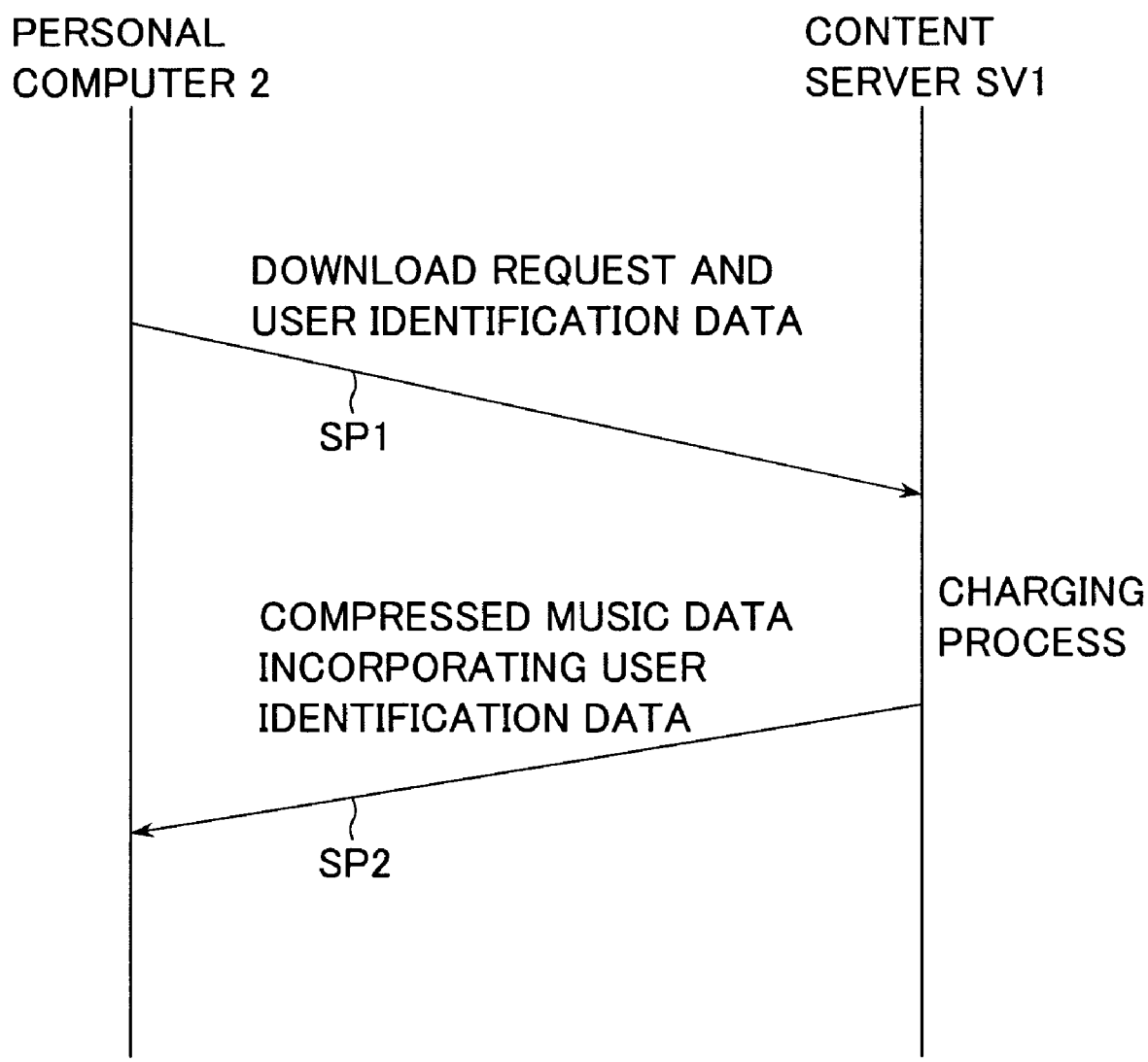
FIG. 3 is a sequence chart showing a download process.

If the user issues instructions to perform a purchase/download operation to purchase and download music data held by the content server SV1 through the operation unit 10, then the main controller 11 transmits, to the content server SV1, a download request signal for requiring to download the music data according to the above-mentioned purchase/download operation and a user identification data for identifying a user who issued instructions to perform the above-mentioned purchase/download operation, in step SP1, FIG. 3.

In addition, in the case of the present example of preferred embodiment of the invention, the user identification data is generated by the main controller 11 in advance based on a user ID (Identification) etc. inputted by the above-mentioned user when logging in the personal computer 2.

If receiving the download request signal and the user identification data from the personal computer 2, the content server SV1 performs a charge process for charging a user indicated by the user identification data. Then, having completed the charge process normally, the content server SV1 performs a compression and encoding process with respect to the music data according to the above-mentioned download request signal so as to generate the compressed music data, then adds the user identification data received from the personal computer 2 to the above-mentioned compressed music data, and transmits it to the personal computer 2, in step SP2, FIG. 3.

Having received the compressed music data to which the user identification data from the content server SV1 is added, the network processing unit 12 of the personal computer 2 stores it in a hard disk drive 13, under the control of the main controller 11.

In this way, the personal computer 2 accumulates, in the hard disk drive 13, the compressed music data obtained from the content server SV1 according to the purchase/download operation instructed by the user.

Further, if the reproducing operation to reproduce the compressed music data stored and held in the hard disk drive 13 is performed according to the user's instructions through the operation unit 10, then the main controller 11 reads the above-mentioned compressed music data from the hard disk drive 13 and transmits it to a decoder unit 15, displaying title information etc. corresponding to the above-mentioned compressed music data, on a display unit 14.

The decoder unit 15 performs the expansion and decoding process with respect to the compressed music data from the hard disk drive 13, and transmits the resulting music data to a music data processing unit 16 which includes a DSP (Digital Signal Processor), a D/A converter, a filter, etc., under the control of the main controller 11. The music data processing unit 16 obtains a music signal by performing the D/A conversion process etc., with respect to the music data from the decoder unit 15, and plays music based on the music signal by way of speaker 17.

Now, if the portable reproducing apparatus 3 is connected to a connection 18 (equivalent to a USB (Universal Serial Bus) terminal etc.) of the personal computer 2 through a cable (not shown), an owner recognition unit 19 recognizes a user who owns the portable reproducing apparatus 3 based on owner information, of the portable reproducing apparatus, transmitted from the above-mentioned portable reproducing apparatus 3 under the control of the main controller 11.

Thereafter, if a transmission operation to transmit the compressed music data stored in the hard disk drive 13 to the portable reproducing apparatus 3 is instructed through the operation unit 10, the main controller 11 determines whether or not the user indicated by the user identification data added to the above-mentioned compressed music data (i.e., the user who purchased and downloaded the above-mentioned compressed music data) is the same as the user who owns the portable reproducing apparatus 3 recognized by the owner identification unit 19. If it is determined that they are the same, the main controller 11 reads the above-mentioned compressed music data from the hard disk drive 13, and transmits it to the portable reproducing apparatus 3.

(3) STRUCTURE OF PORTABLE REPRODUCING APPARATUS

Figure 4:
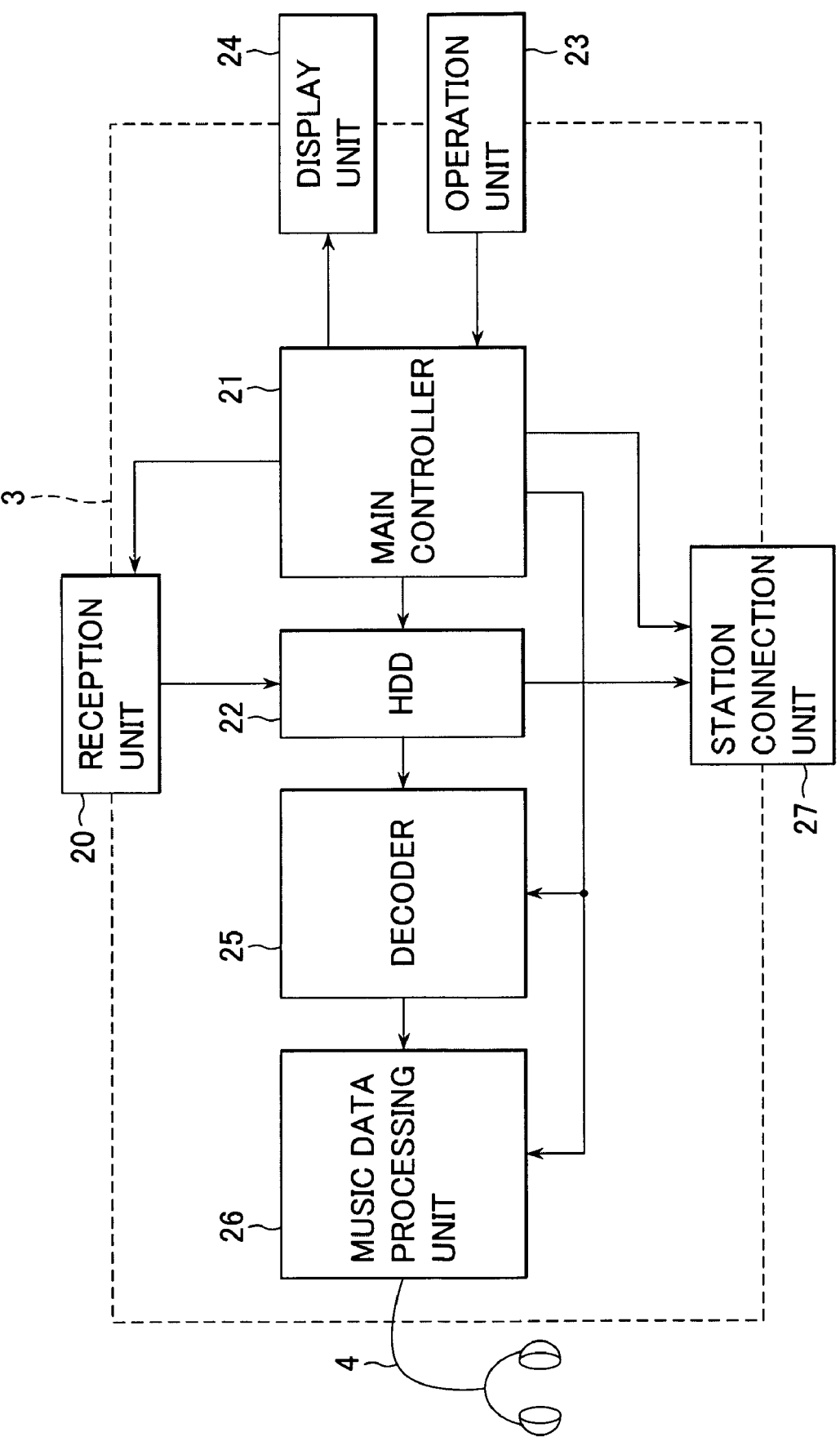
FIG. 4 is a circuit block diagram showing a structure of a portable reproducing apparatus.

In the portable reproducing apparatus 3 as shown in FIG. 4, under the control of a main controller 21, a reception unit 20 receives the compressed music data to which the user identification data from the personal computer 2 is added and then stores it in a hard disk drive 22.

In this way, the portable reproducing apparatus 3 can accumulate the compressed music data from the personal computer 2 in the hard disk drive 22.

Thereafter, if the portable reproducing apparatus 3 is removed from the connection 18 of the personal computer 2, and carried and used by the user, and if the reproducing operation to reproduce the compressed music data stored in the hard disk drive 22 is instructed through an operation unit 23, then the main controller 21 reads the above-mentioned compressed music data from the hard disk drive 22, and transmits it to a decoder unit 25, displaying the title information etc. corresponding to the above-mentioned compressed music data on a display unit 24.

Under the control of the main controller 21, the decoder unit 25 performs the expansion and decoding process with respect to the compressed music data from the hard disk drive 22, and transmits the resulting music data to a music data processing unit 26 which includes the DSP, the D/A converter, the filter, etc.

Under the control of the main controller 21, the music data processing unit 26 performs the D/A conversion process etc. with respect to the music data from the decoder unit 25 so as to obtain a music signal, and plays music based on this music signal through earphones 4.

In addition, since the above-mentioned portable reproducing apparatus 3 is designed on the assumption that the music is listened to not via a large-sized speaker etc. installed indoors, but through the earphones 4, the mounted decoder unit 25 and music data processing unit 26 have only processing accuracy (equivalent to operation accuracy etc.) according to this assumption.

On the other hand, the portable reproducing apparatus 3 has a station connection 27 to be connected with the station 5 of the audio apparatus 7 installed in the car of the user.

For example, if the user inserts the portable reproducing apparatus 3 into the insertion hole HL of the station 5 in the car, the main controller 21 detects that it is inserted into the above-mentioned insertion hole HL through the station connection 27. Then, the main controller 21 transmits a communication starting request signal for requiring starting communications through the cable 6 which connects the station 5 to the audio apparatus 7. Further, if the station connection 27 receives a response signal corresponding to the above-mentioned communication starting request signal from the audio apparatus 7, it becomes possible to communicate data between the station connection 27 and the audio apparatus 7. As a result, the portable reproducing apparatus 3 can communicate data with the audio apparatus 7.

Thus, in a situation where the data communications with the audio apparatus 7 is possible, for example, if the reproducing operation to reproduce the compressed music data stored in the hard disk drive 22 is instructed through the operation unit 23, then the main controller 21 transmits the above-mentioned compressed music data to which the user identification data is added, to the audio apparatus 7.

(4) STRUCTURE OF AUDIO APPARATUS

Figure 5:
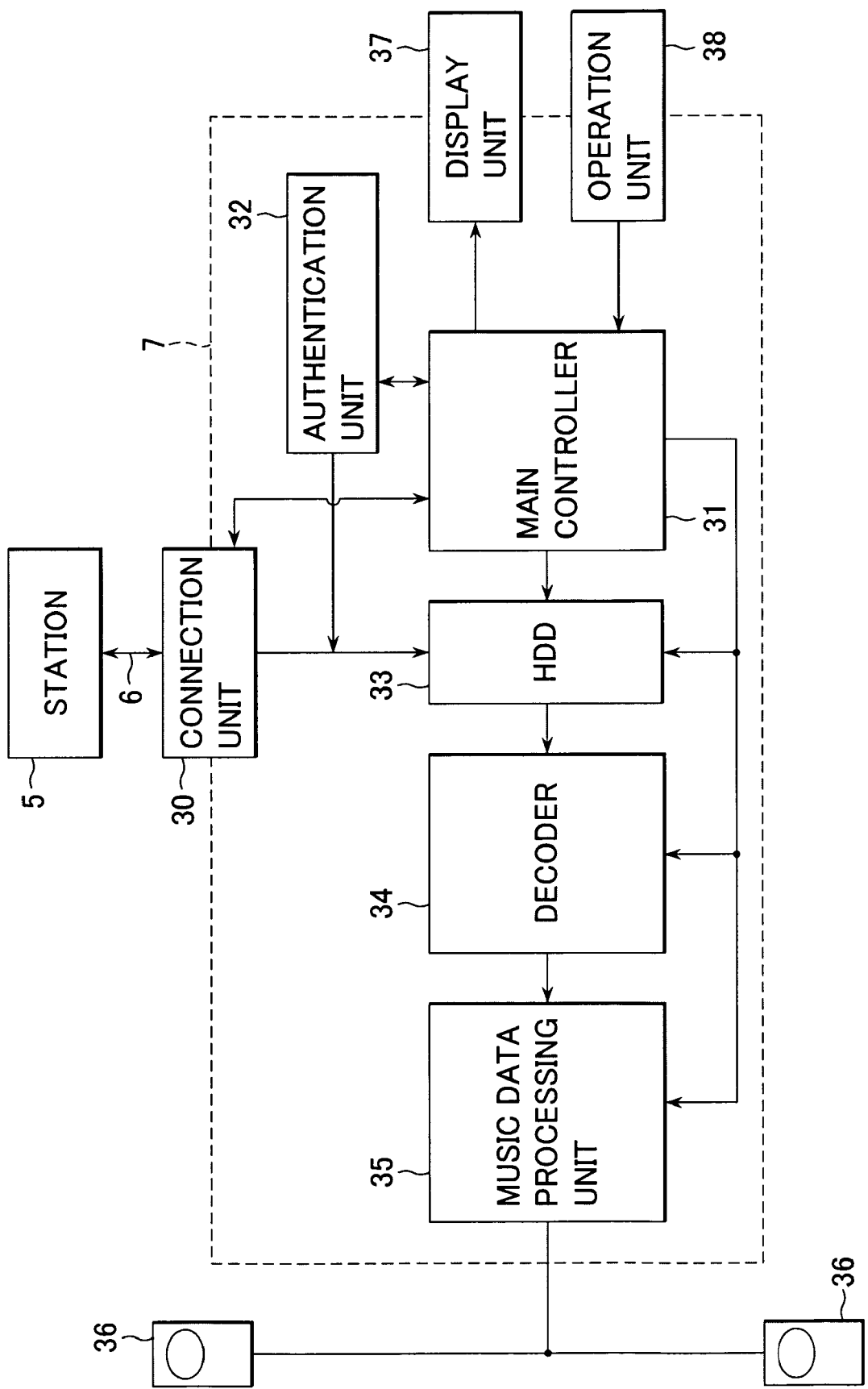
FIG. 5 is a circuit block diagram showing a structure of an audio apparatus.

In the audio apparatus 7 as shown in FIG. 5, if a connection 30 which is connected with the station 5 through the cable 6 receives a communication starting request signal from the portable reproducing apparatus 3 which is inserted into the station 5, the corresponding response signal is transmitted to the portable reproducing apparatus 3 under the control of a main controller 31. Thus, the connection 30 is in a state where data communications with the portable reproducing apparatus 3 are possible, so that the audio apparatus 7 starts data communications with the portable reproducing apparatus 3.

In this way, if the data communications with the portable reproducing apparatus 3 is started, an authentication unit 32 firstly performs an authentication process of authenticating the above-mentioned portable reproducing apparatus 3, under the control of the main controller 31.

After this authentication process is completed normally, the compressed music data to which the user identification data from the above-mentioned portable reproducing apparatus 3 is added is transmitted by performing the reproducing operation to the portable reproducing apparatus 3, for example, so that the main controller 31 receives it via the connection 30, and temporarily stores it in a hard disk drive 33.

Subsequently, the main controller 31 reads the compressed music data temporarily stored in the hard disk drive 33, and transmits the data to a decoder unit 34. The decoder unit 34 performs the expansion and decoding process with respect to the compressed music data from the hard disk drive 33, and transmits the resulting music data to a music data processing unit 35 under the control of the main controller 31.

By performing the D/A conversion process etc. with respect to the music data from the decoder unit 34, the music data processing unit 35 obtains a music signal and, accordingly, plays back music from a speaker 36.

In addition, the above-mentioned audio apparatus 7 is designed on the assumption that the music is listened to through the speaker 36 in the car, therefore, the mounted decoder unit 34 and music data processing unit 35 have higher processing accuracy than the decoder unit 25 and the music data processing unit 26 of the portable reproducing apparatus 3. Thus, compared with the portable reproducing apparatus 3, the audio apparatus 7 can reproduce the music signal of a higher quality from the compressed music data. As a result, it is possible to play the music of a remarkably sufficient sound quality.

If reproducing of this compressed music data is completed, the main controller 31 recognizes the user who purchased and downloaded the above-mentioned compressed music data based on the user identification data added to the above-mentioned compressed music data, and also recognizes the user who owns the audio apparatus 7 based on the audio apparatus owner information stored in the hard disk drive 33 beforehand. Then, the main controller 31 determines whether or not the user who purchased and downloaded the above-mentioned compressed music data is the same as the user who owns the audio apparatus 7.

If it is determined that the user who purchased and downloaded compressed music data is the same as the user who owns the audio apparatus 7, the main controller 31 continues to store the above-mentioned compressed music data stored in the hard disk drive 33.

Thus, even if the portable reproducing apparatus 3 to which the above-mentioned compressed music data is stored is not inserted into the station 5, the audio apparatus 7 can play the music of a satisfactory sound quality at a later time according to the above-mentioned compressed music data stored in the hard disk drive 33.

On the other hand, if it is determined that the user who purchased and downloaded the compressed music data is not the same as the user who owns this audio apparatus 7, then the main controller 31 removes the above-mentioned compressed music data stored once in the hard disk drive 33.

This prevents the above-mentioned compressed music data from being kept stored and held in the audio apparatus 7 owned by another person other than the user who purchased and downloaded the above-mentioned compressed music data.

(5) REPRODUCING PROCESS

Figure 6:
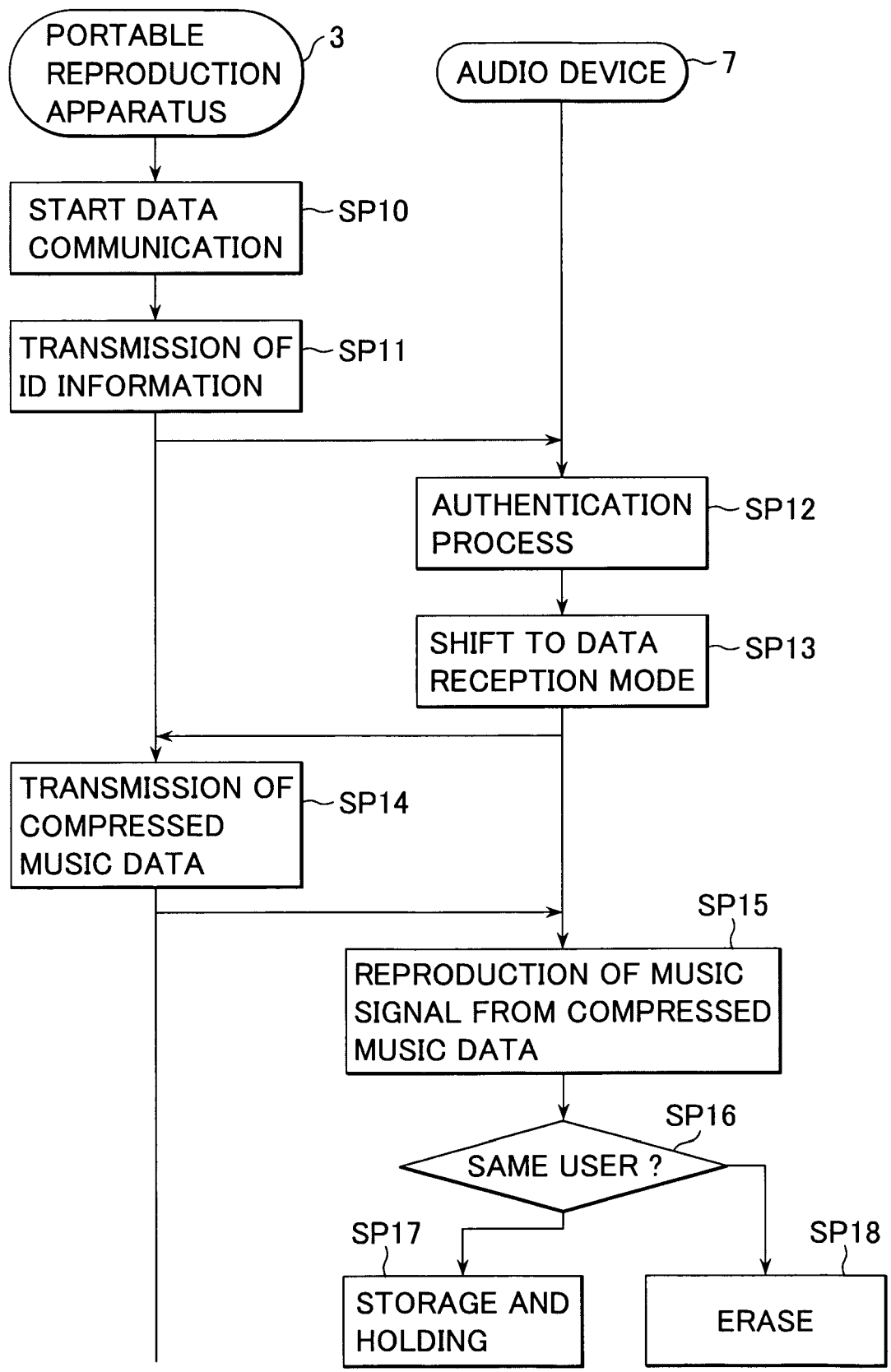
FIG. 6 is a flow chart showing a music reproducing process.

Now, a procedure of the reproducing process performed between the portable reproducing apparatus 3 and the audio apparatus 7 will be described by using a flow chart of FIG. 6.

For example, if the portable reproducing apparatus 3 is carried into the car by the user and inserted into the insertion hole HL of the station 5, then the main controller 21 of the portable reproducing apparatus 3 starts data communications with the audio apparatus 7 in step SP10.

Then, moving the process to step SP11, the main controller 21 of the portable reproducing apparatus 3 transmits, to the audio apparatus 7, ID information uniquely assigned to this portable reproducing apparatus 3 (for example, equivalent to a production number etc.).

If the ID information is received from the portable reproducing apparatus 3, the main controller 31 of the audio apparatus 7 moves the process to step SP12 and performs an authentication process based on the received ID information.

Now, ID information of the portable reproducing apparatus 3 which can use the audio apparatus 7 is registered beforehand in the authentication unit 32 of the audio apparatus 7. As such an authentication process, the main controller 31 of the audio apparatus 7 determines whether or not the ID information received from the portable reproducing apparatus 3 is registered with the authentication unit 32. If it is determined that the above-mentioned ID information is registered, the authentication process is normally terminated and moves the process to step SP13, so as to move to a data reception mode in which the compressed music data transmitted from the portable reproducing apparatus 3 is received.

Thereafter, if the reproducing operation to reproduce the compressed music data stored and held in the hard disk drive 22 of the above-mentioned portable reproducing apparatus 3 is instructed through the operation unit 23 of the portable reproducing apparatus 3, for example, then the main controller 21 of the portable reproducing apparatus 3 moves the process to step SP14, reads the compressed music data according to the above-mentioned reproducing operation from the hard disk drive 22, and transmits it to the audio apparatus 7.

If the compressed music data is received from the portable reproducing apparatus 3, the main controller 31 of the audio apparatus 7 moves the process to step SP15, and stores once this compressed music data in the hard disk drive 33. Then, the main controller 31 of the audio apparatus 7 processes the above-mentioned compressed music data in the decoder unit 34 and the music data processing unit 35 which are installed in the audio apparatus 7, to thereby obtain a music signal of a better quality than that processed in the decoder unit 25 and the music data processing unit 26 of the portable reproducing apparatus 3, and play the music based on this from a speaker 47.

Thus, in the music reproducing system 1, the compressed music data stored and held in the portable reproducing apparatus 3 is processed in the decoder unit 34 and the music data processing unit 35 of the audio apparatus 7 which have higher processing accuracy than the decoder unit 25 and the music data processing unit 26 of the portable reproducing apparatus 3, therefore, it is possible to obtain the music signal of a better quality than that processed in the decoder unit 25 and the music data processing unit 26 of the portable reproducing apparatus 3, whereby the music of a satisfactory sound quality can be provided to the user.

Subsequently, the main controller 31 of the audio apparatus 7 moves the process to step SP16, and determines whether or not the user who purchased and downloaded the above-mentioned compressed music data is the same as the user who owns the audio apparatus 7, based on the user identification data added to the compressed music data which is reproduced in step SP15 and the audio apparatus owner information stored in the hard disk drive 33 beforehand.

Now, if an affirmative result is obtained, it means that the user who purchased and downloaded the above-mentioned compressed music data is the same as the user who owns the audio apparatus 7. At this event, the main controller 31 of the audio apparatus 7 determines that copyright-related issues does not arise even if it causes the audio apparatus 7 to keep storing and holding the above-mentioned compressed music data. Then, the process goes to step SP17, the above-mentioned compressed music data stored once in the hard disk drive 33 is kept stored and held as it is.

On the contrary, if a negative result is obtained, it means that the user who purchased and downloaded the above-mentioned compressed music data is not the same as the user who owns the audio apparatus 7. At this event, the main controller 31 of the audio apparatus 7 determines that copyright-related issues may arise if it continues to store the above-mentioned compressed music data in the audio apparatus 7. It moves the process to step SP18, and removes the above-mentioned compressed music data stored once in the hard disk drive 33.

(6) OPERATION AND EFFECTS

In the above structure, the portable reproducing apparatus 3 is inserted into a station 5, so as to be in a state in which data communications with the audio apparatus 7 are possible. If the reproducing operation is instructed by the user through the operation unit 23, the portable reproducing apparatus 3 reads the compressed music data according to the above-mentioned reproducing operation from the hard disk drive 22, and transmits it to the audio apparatus 7.

Having received the compressed music data from the portable reproducing apparatus 3, the audio apparatus 7 processes the above-mentioned compressed music data by means of the decoder unit 34 and the music data processing unit 35 mounted in the audio apparatus 7, so as to reproduce the music signal of better quality than that processed in the decoder unit 25 and the music data processing unit 26 of the portable reproducing apparatus 3.

As a result, the audio apparatus 7 can play the music of a satisfactory sound quality from the speaker 36, based on the above-mentioned music signal.

After completion of the reproduction of the compressed music data, the audio apparatus 7 determines whether or not the user who purchased and downloaded the compressed music data is the same as the user who owns this audio apparatus 7.

If it is determined that the user who purchased and downloaded the compressed music data is the same as the user who owns this audio apparatus 7, the audio apparatus 7 continues to store the above-mentioned compressed music data stored in the hard disk drive 33.

Thus, even if the portable reproducing apparatus 3 in which the above-mentioned compressed music data is stored is not inserted into the station 5, the audio apparatus 7 can play the music of a satisfactory sound quality at a later time, according to the above-mentioned compressed music data stored in the hard disk drive 33.

On the other hand, if it is determined that the user who purchased and downloaded the compressed music data is not the same as the user who owns this audio apparatus 7, then the audio apparatus 7 removes the above-mentioned compressed music data stored once in the hard disk drive 33.

This prevents the above-mentioned compressed music data from being kept stored and held in the audio apparatus 7 owned by another person other than the user who purchased and downloaded the above-mentioned compressed music data.

According to the above structure, based on the user identification data transmitted together with the compressed music data from the portable reproducing apparatus 3, if the audio apparatus 7 recognizes that the user who purchased and downloaded the above-mentioned compressed music data is the same as the user who owns the above-mentioned audio apparatus 7, then it stores and holds the above-mentioned compressed music data after reproducing the music signal from the above-mentioned compressed music data by means of the decoder unit 34 and the music data processing unit 35. Alternatively, if it recognizes that the user who purchased and downloaded the above-mentioned compressed music data is not the same as the user who owns the above-mentioned audio apparatus 7, it removes the above-mentioned compressed music data after reproducing the music signal from the above-mentioned compressed music data by means of the decoder unit 34 and the music data processing unit 35. Thus, the compressed music data stored in the portable reproducing apparatus 3 can selectively be stored and held only in the audio apparatus 7 of the user who purchased and downloaded duly, to thereby avoid copyright-related issues.

On the other hand, the user who duly purchased and downloaded the above-mentioned compressed music data can always listen to the music based on the above-mentioned compressed music data through the audio apparatus 7 owned by the above-mentioned user with a satisfactory sound quality, without inserting the portable reproducing apparatus 3 in the station 5 again. As a result, the convenience for the above-mentioned user can be improved considerably.

(7) OTHER EMBODIMENTS

In addition, in the above-mentioned examples of preferred embodiments of the present invention, although the exemplary case has been described in which the music signal is reproduced from the music data as content data by the first reproducing apparatus (the portable reproducing apparatus 3) and the second reproducing apparatus (the audio apparatus 7), the present invention is not limited thereto, but may be applied to the case of reproducing other various content data, such as a video content, etc.

Further, in the above-mentioned preferred embodiment, although the exemplary case has been described in which the decoder unit 25 and the music data processing unit 26 of the portable reproducing apparatus 3 are applied as the reproducing means of the first reproducing apparatus, the present invention is not limited thereto, but may use other various structures.

Furthermore, in the above-mentioned preferred embodiments, although the exemplary cases have been described in which the decoder unit 34 and the music data processing unit 35 mounted on the audio apparatus 7 are applied as the high-quality reproducing means to reproduce a high-quality signal from the content data, the present invention is not limited thereto, but may use other various structures.

Furthermore, in the above-mentioned preferred embodiments, although the exemplary cases have been described in which the hard disk drive 22 of the portable reproducing apparatus 3 is used for the storage means for linking and storing the content data to be reproduced (the compressed music data) with the propriety data (the user identification data) indicating whether or not the reproducing apparatus can store the above-mentioned content data, the present invention is not limited thereto, but may use a non-volatile semiconductor memory, etc.

Moreover, in the above-mentioned preferred embodiments, although the exemplary cases have been described in which the station connection 27 of the portable reproducing apparatus 3 is applied as the transmission means for transmitting the content data stored in the storage means and the propriety data corresponding to the above-mentioned content data, to the second reproducing apparatus, the present invention is not limited thereto, but may use other various structures such as a radio communications unit for wirelessly communicating with the reproducing apparatus (the audio apparatus 7).

Furthermore, although the exemplary cases have been described in which the main controller 31 of the audio apparatus 7 is applied as the recognition means or the controller for recognizing whether or not the above-mentioned content data can be stored and held based on the above-mentioned propriety data if the content data and the propriety data are received from the first reproducing apparatus, the present invention is not limited thereto, but may also use a CPU (Central Processing Unit) etc.

The present invention can be applied to a reproducing system, such as a music reproducing system including a portable reproducing apparatus such as an MP3 player and an audio apparatus which is installed indoors.

Therefore, the examples of preferred embodiments described above are only for exemplification purposes of the present invention. It should be noted that the present invention is not to be restricted to such embodiments and examples, so that various modifications, combinations and sub-combinations, etc., may be made without departing from the scope and spirit of the present invention.

What is claimed is:

1. A reproducing system comprising a first reproducing apparatus and a second reproducing apparatus for reproducing a signal from content data, wherein:

the first reproducing apparatus comprises:
a storage means for linking and storing the content data to be reproduced and propriety data indicating whether the second reproducing apparatus has propriety of storing and holding the content data, wherein the propriety data includes user information identifying an owner of the content data; and
a transmitter for transmitting the content data stored in the storage means and the propriety data corresponding to the content data to the second reproducing apparatus; and the second reproducing apparatus comprises:
a recognition means for recognizing whether the content data is authorized to be stored and held based on the propriety data, upon receiving the content data and the propriety data from the first reproducing apparatus; and
a controller for:
temporarily storing the content data received from the first reproducing apparatus and reproducing the signal from the content data irrespective of the propriety data;
storing and holding the content data into a storage means after reproducing the signal from the content data if the recognition means recognizes propriety of storing and holding the content data; and
deleting the content data after reproducing the signal from the content data if the recognition means recognizes no propriety of storing or holding the content data, wherein the second reproducing apparatus reproduces a signal of higher quality than the first reproducing apparatus from the content data.

2. The reproducing system according to claim 1, wherein:
the recognition means of the second reproducing apparatus decides whether a user indicated by the user information in the propriety data and a user as owner of the second reproducing apparatus are identical and, if decided that the users are identical, recognizes the content data is authorized to be stored and held.

3. A reproducing method, comprising:
receiving information identifying first reproducing apparatus;
determining, based on the information identifying the first reproducing apparatus, whether the first reproducing apparatus is authorized to transmit data to a second reproducing apparatus;
receiving the content data from the first reproducing apparatus when it is determined that the first reproducing apparatus is authorized to transmit data to the second reproducing apparatus;
recognizing whether or not the second reproducing apparatus having received the content data and propriety data indicating whether the second reproducing apparatus has propriety of storing and holding content data from the first reproducing apparatus for reproducing a signal from the content data, is authorized to store and hold the content data, based on the propriety data, wherein the propriety data includes user information identifying an owner of the content data, and wherein it is determined that the second reproducing apparatus is authorized to store and hold the received content data if the owner of the content data is identical to an owner of the second reproducing apparatus;
temporarily storing the content data received by the second reproducing apparatus and reproducing the signal from the content data irrespective of the propriety data; and
storing and holding the content data into a storage means after reproducing the signal from the content data if it is determined that the second reproducing apparatus is authorized to store and hold the received content data, and deleting the content data after reproducing the signal from the content data if it is determined that the second reproducing apparatus is not authorized to store or hold the received content data.

* * * * *